United States Patent
Deolalikar

(10) Patent No.: US 8,793,264 B2
(45) Date of Patent: Jul. 29, 2014

(54) DETERMINING A SUBSET OF DOCUMENTS FROM WHICH A PARTICULAR DOCUMENT WAS DERIVED

(75) Inventor: Vinay Deolalikar, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1963 days.

(21) Appl. No.: 11/879,992

(22) Filed: Jul. 18, 2007

(65) Prior Publication Data

US 2009/0024608 A1    Jan. 22, 2009

(51) Int. Cl.
*G06F 17/30*    (2006.01)

(52) U.S. Cl.
USPC .......................................................... 707/758

(58) Field of Classification Search
USPC ...................................................... 707/5, 758
See application file for complete search history.

(56) References Cited

U.S. PATENT DOCUMENTS

| | | | |
|---|---|---|---|
| 5,808,615 A * | 9/1998 | Hill et al. ...................... 715/853 |
| 6,018,733 A * | 1/2000 | Kirsch et al. ...................... 707/3 |
| 6,236,987 B1 * | 5/2001 | Horowitz et al. .................. 707/3 |
| 6,446,061 B1 * | 9/2002 | Doerre et al. ...................... 707/3 |
| 6,978,274 B1 * | 12/2005 | Gallivan et al. ............... 707/102 |
| 7,188,117 B2 * | 3/2007 | Farahat et al. ................ 707/101 |
| 7,313,556 B2 * | 12/2007 | Gallivan et al. ................... 707/6 |
| 7,483,892 B1 * | 1/2009 | Sommer et al. ..................... 707/5 |
| 2002/0178155 A1 * | 11/2002 | Sakurai ............................. 707/3 |
| 2006/0089947 A1 * | 4/2006 | Gallivan et al. ............... 707/102 |
| 2008/0294651 A1 * | 11/2008 | Masuyama et al. ........... 707/100 |

* cited by examiner

*Primary Examiner* — Joshua Bullock

(57) ABSTRACT

Embodiments of the present invention pertain to determining a subset of documents from which a particular document was derived. According to one embodiment, similarity measurements indicating similarities between contents of documents are received. A subset of the documents that the particular document was derived from is determined based on dates the documents were created and the similarity measurements without requiring document tracking information to be associated with the documents to determine the subset.

20 Claims, 6 Drawing Sheets

FORWARD-IN-TIME GRAPH 100

MARKOV CHAIN 310

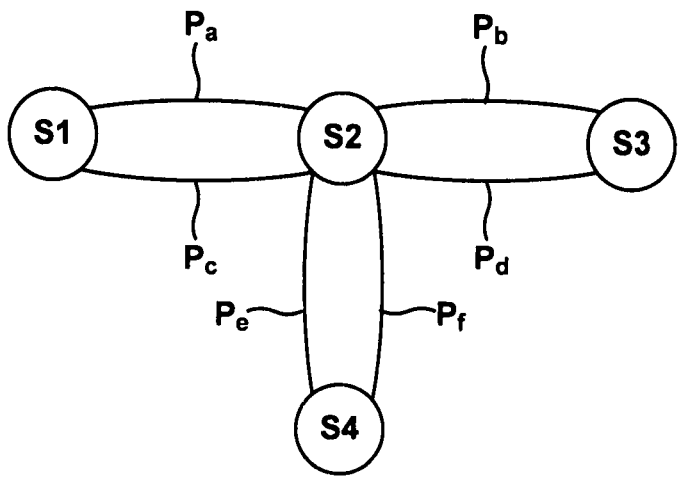

MATRIC 320 (BASED ON A MARKOV CHAIN)

$$\begin{array}{c} \\ D1 \\ D2 \\ D3 \\ D4 \\ D5 \\ D6 \end{array} \begin{array}{cccccc} D1 & D2 & D3 & D4 & D5 & D6 \\ \left[\begin{array}{cccccc} & & & & & \\ P_1 & 0 & P_6 & P_7 & P_9 & P_8 \\ & & & & & \\ & & & & & \\ & & & & & \\ & & & & & \end{array}\right] \end{array} = M$$

Determine a stable matrix $M^n$ by multiplying M times itself such That $M^2, M^3, M^4, ... M^{n-1}, M^n$ Assume that $p'_6$ (D3) > $p'_1$ (D1) > $p'_7$ (D4) > $p'_9$ (D5) > $p'_8$ (D6) associated with the matrix $M^n$, which is at least relatively stable, then the subset would include D3, D1, D4, D5, and D6, according to one embodiment.

FIG. 3

$$\frac{1}{P_{ij}} = \sum \frac{1}{\sum\limits_{k=1}^{t} s(D_{ik}, D_{ik-1}) p^{t-k}} \quad (1)$$

$$\frac{1}{P_8} = \frac{1}{a} + \frac{1}{dxi} + \frac{1}{cxg} + \frac{1}{cxbxa} \quad (2)$$

$$\lim_{n \to \infty} v(0) P^{(n)} = v(0) \lim_{n \to \infty} P^n \quad (3)$$

$$\lim_{n \to \infty} v(0) P^{(n)} \quad (4)$$

FIG. 6

DETERMINING A SUBSET OF DOCUMENTS FROM WHICH A PARTICULAR DOCUMENT WAS DERIVED

TECHNICAL FIELD

Embodiments of the present invention relate to electronic documents. More specifically, embodiments of the present invention relate to determining a subset of documents from which a particular document was derived.

BACKGROUND ART

In this age of information proliferation, it is becoming harder and harder to determine what documents influenced the creation of other documents. For example, a high level manager of a company may be reading a particular document as a part of making decisions. The manager may want to revisit the thought process that went into the concepts described in that particular document and discuss the thought processes with the people who contributed to the concepts. Determining what documents influenced the creation of the document enables determining the people who contributed to the concepts and revisiting the thought process that went into creating the concepts. What documents influenced the creation of a particular document is commonly referred to as "provenance" or the "provenance question."

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 depicts a generic Markov chain, according to one embodiment.

FIG. 6 depicts equations, according to various embodiments.

Figure 1:
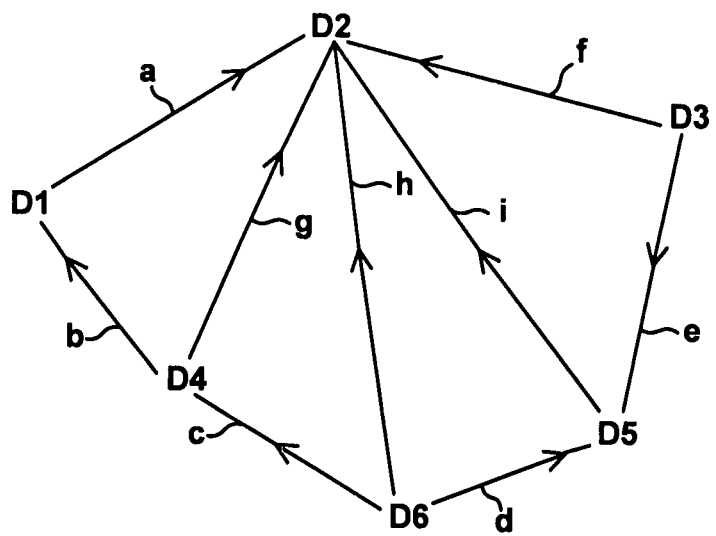
FIG. 1 depicts a forward-in-time graph, according to one embodiment.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail as not to unnecessarily obscure aspects of the present invention.

Overview

To date, research is being performed to determine how and what kinds of document tracking information to associate with documents in order to answer the provenance question. However, even after methods of associating tracking information with documents have been perfected, it will be almost impossible to force people to associate document tracking information with their documents. Further, there will always be a large quantity of legacy documents that do not have tracking information associated with them. According to one embodiment, the provenance question is answered using the content of documents without requiring tracking information to be associated with documents.

According to one embodiment, an algorithm is used to measure the similarity between the contents of documents, for example, associated with a company or an organization. The documents associated with the company or organization shall be referred to herein as a "document universe." The documents that the particular document d2 is derived from are determined. The documents that the particular document is derived from form a subset of the document universe. Dates that the documents were created and similarity measurements are used to determine the subset. Document tracking information is not required to be associated with the documents to determine the subset, as will become more evident.

Documents

Examples of documents include emails, word documents, PDFs (portable document format), files in a file system, or files in a database, among other things. A document that does not have associated document tracking information is commonly referred to as an "unstructured document." Almost all documents that are in existence today are unstructured documents.

Similarity Measurements

As already stated, various algorithms can be used to determine the similarity between two documents' contents. These algorithms shall be referred to herein as "similarity algorithms." Examples of similarity algorithms include, but are not limited to, Broder similarity, Jacard measure and Cosine measure. Typically, a similarity algorithm returns a value between 0 and 1 indicating the degree of similarity between two documents' contents. For example, a value of 0 would indicate that there is no similarity between two documents' contents. More specifically, if a document about astronomy in French and a document about medicine in Chinese were compared by a similarity algorithm, a value of 0 indicating no similarity would probably be returned. A value of 1 would indicate that two documents' contents are identical. A value, for example, of 0.8 would indicate a high level of similarity and a value, for example, of 0.2 would indicate a low level of similarity.

Forward-in-Time Graph

According to one embodiment, a maximum path length is received indicating how many generations of documents are desired to be analyzed. For example, assume that a user wants to determine the subset of documents that a document d2 was derived from. A maximum path length of 3 would cause the subset to include the parents, the grandparents, and the great grandparents of document d2. The documents that the document d2 is derived from form a subset of a document universe. Continuing the example, the subset, according to one embodiment, a forward-in-time graph is used as a part of determining the subset. Although many of the embodiments were described using a maximum path length of 3, other maximum path lengths may be used depending on how many generations of documents a user is interested in having analyzed.

FIG. 1 depicts a forward-in-time graph, according to one embodiment. Continuing the example, the forward-in-time graph 100 depicts the parents, grandparents, and great grandparents of document 3 because a maximum path length of 3 was used to create the forward-in-time graph 100. According to one embodiment, the dates that documents were created and the similarity measurements are used to create a forward-in-time graph 100 of documents with a degree of similarity. For example, the forward-in-time graph 100 includes nodes that represent documents d1, d3-d6 with content that is similar to document d2, arrows that point from an older document to a newer document for each document pair, and similarity measurements a-i between each document pair. For example, document d3 is older than document d5. The arrow associated with the line between documents d3 and d5 points from the older document d3 towards the newer document d5. The similarity measurement e between document d3 and d5 is associated with the line between d3 and d5. Lines, arrows, and similarity measurements are also associated with the other document pairs depicted in the forward-in-time graph 100.

Reversed-in-Time Graph

Figure 2:
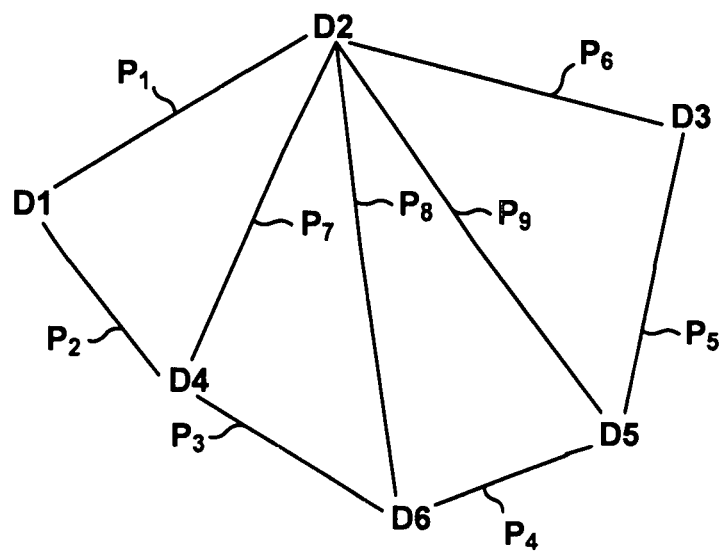
FIG. 2 depicts a reversed-in-time graph, according to one embodiment.

FIG. 2 depicts a reversed-in-time graph, according to one embodiment. Since the provenance question pertains to what documents a particular document is derived from, the forward-in-time graph 100 is reversed to create a reverse-in-time graph 200. For example, the arrow between documents d3 and d5 depicted in FIG. 2 is the reverse of the arrow between documents d3 and d5 depicted in FIG. 1. Similarly, the arrows for lines between the other document pairs are reversed.

For the sake of simplicity, the reverse-in-time graph 200 is a simple graph. In a more complex graph, lines may be added between documents that have path lengths less than the maximum path length parameter. For example, lines may be added between parent and child documents but may also be added between every grandparent and every child document, between every great grand parent and every child document, and so on.

As a part of creating the reverse-in-time graph, the similarity measurements are normalized. For example, similarity measurements associated with the paths, which are less than or equal to the maximum path length, between each pair of documents are used to determine probabilities that one document associated with a document pair is older than the other document associated with the document pair. Continuing the example of determining the subset of documents that document d2 was derived from. The paths of lengths 1, 2 and 3 and the associated similarity measurements for a particular pair of documents are obtained from the forward-in-time graph 100 depicted in FIG. 1. Assume that the document pair being considered is d2 and d6. There is one path of length 1 between d6 and d2. It is d6 to d2. There are two paths of length 2 between d6 and d2. They are d6 to d5 to d2 and d6 to d4 to d2. There is one path of length 3 between d6 and d2. It is d6 to d4 to d1 to d2. The similarity measurements associated with the paths between the pair of documents being considered as used to determine a probability that the older document d6 resulted in the newer document d2. For example, the probability that an older document resulted in a newer document can be determined using an equation (1) as depicted in FIG. 6 where e represents the maximum path length. Returning to the example, the probability $p_8$ that document d6 resulted in document d2 can be computed as depicted in FIG. 6 using equation (2) where equation (1) is used for the denominators.

The probabilities P1-P7 depicted in FIG. 2 can be computed in a similar manner for all paths of length 3 and less between each document pair. For example, consider the document pair d5 and d2. There is one path of length 1, d5 to d2, one path of length 2, d5 to d3 to d2, and there are no paths of length 3. The probability $p_9$ can be computed based on the similarity measurements associated with the path d5 to d2 and the path d2 to d3 to d2 in a similar way that probability $p_8$ was computed using equation 2 depicted in FIG. 6.

Markov Chain

The Markov chain represents documents as states and probabilities are associated with the transitions between the states. FIG. 3 depicts a generic Markov chain, according to one embodiment. The nodes of the Markov chain are states s1-s4 and probabilities $p_a$-$p_f$ are associated with the transitions between the states s1-s4. According to one embodiment, the documents are represented as states of a Markov chain and the probabilities are associated with the transitions from one document to another document. Continuing the example, a Markov chain could be created where the nodes represent documents d1-d6 (FIG. 2) and the probabilities $p_1$-$p_9$ (FIG. 2) are associated with the transitions between the documents d1-d6.

Matrix of Probabilities

A matrix of probabilities between the documents is derived based on the Markov chain, according to one embodiment. FIG. 3 depicts a part of a matrix 320 that is derived based on a Markov chain. The symbol "M" shall also be used to refer to the matrix 320. The rows and the columns of the matrix 320 represent the documents d1-d6. Each cell of the matrix 320 depicts a probability that corresponds to a particular combination of a row and a column. The probabilities $p_1$-$p_9$ as depicted in FIG. 2 are associated with the appropriate cells. For example, the probability that document d2 was derived from document d1 is $p_1$ so $p_1$ is associated with the cell at row d2 and column d1. Document d2 would not result in itself so a 0 is entered for row d2 and column d2. The probability that document d2 was derived from document d3 is $p_6$ so $p_6$ is associated with the cell at row d2 and column d3. For the purposes of simplicity, the probabilities have not been entered for all of the row to column combinations. The sum of the values associated with each row and each column equal 1, according to one embodiment.

Stabilizing the Matrix of Probabilities

The matrix is multiplied by itself until values associated with the matrix reach at least a state of relative stability, according to one embodiment. The matrix M may be squared, cubed, and so on until the values from a one generation of a matrix are relatively similar to the next generation of a matrix, according to one embodiment. For example, assume that the values associated with matrix $M^{n-1}$ are the same or close to the values associated with matrix $M^n$. M shall be referred to as an initial matrix. Matrix M, matrix $M''^{-1}$ and matrix $M''$ shall be referred to as generations of the matrix M.

The values in the relatively stabilized matrix $M''$ are used to determine the subset of documents that a particular document was derived from. Assume that the stabilized matrix $M''$ indicates a probability $p'_6$ that document d2 was derived from d3, a probability $p'_7$, that document d2 was derived from d1, a probability $p'_7$ that document d2 was derived from d4, a probability $p'_9$ that document d2 was derived from d5, and a probability $p'_8$ that document d2 was derived from d6 where $p'_6 > p'_1 > p'_7 > p'_9 > p'_8$. This would indicate, according to one embodiment, document d2 was derived from documents d3, d1, d4, d5 and d6 in that order. In other words, d2 was derived from d3, d3 was derived from d1, d1 was derived from d4, d4 was derived from d5, and d5 was derived from d6.

Using mathematical notation, the process of stabilizing the matrix can be described as follows for documents D, maximum path length $\mu$ and probability $\rho$. Let P be the single step transition probability matrix of the Markov chain $M(D, \mu, \rho)$ and $P^{(n)}$ be the n step transition probability matrix. Then $P^{(n)} = P^n$. Let $v(n) = (v_0(n), v_1(n), \ldots v_m(n))$. Now let v' be the limiting state probability of $M(D, \mu, \rho)$ given the initial state v(0). In other words, the limiting state V can be determined using equation (3) depicted in FIG. 6, according to one embodiment.

Using mathematical notation, the provenance question (determining the subset of documents that a document D was derived from) can be answered by letting $v(0) = (0, 0, \ldots, 1, 0 \ldots, 0)$ where the 1 is at the location of the state corresponding to a document D. All other initial probabilities are zero, according to one embodiment. Equation (4) depicted in FIG. 6 can be used to answer the provenance question. In another example, by letting the initial vector v(0) represent a set of documents instead of just one document, you can get the set of documents from which this set was derived, according to one embodiment. For example, if you let $v(0) = (0.5, 0, 0, 0.5, 0, 0.0)$, and run the Markov chain to its limit, you can get the set of documents from which d1 and d4 were derived. This algorithm works for sets of documents as well as single documents. A "weight" can be associated with a set, according to one embodiment. For example, if d1 is more important to you than d4, you can set $v = (0.8, 0, 0, 0.2, 0, 0, 0 \ldots 0)$ to skew the results towards d1, thus, providing flexibility.

Figure 4:
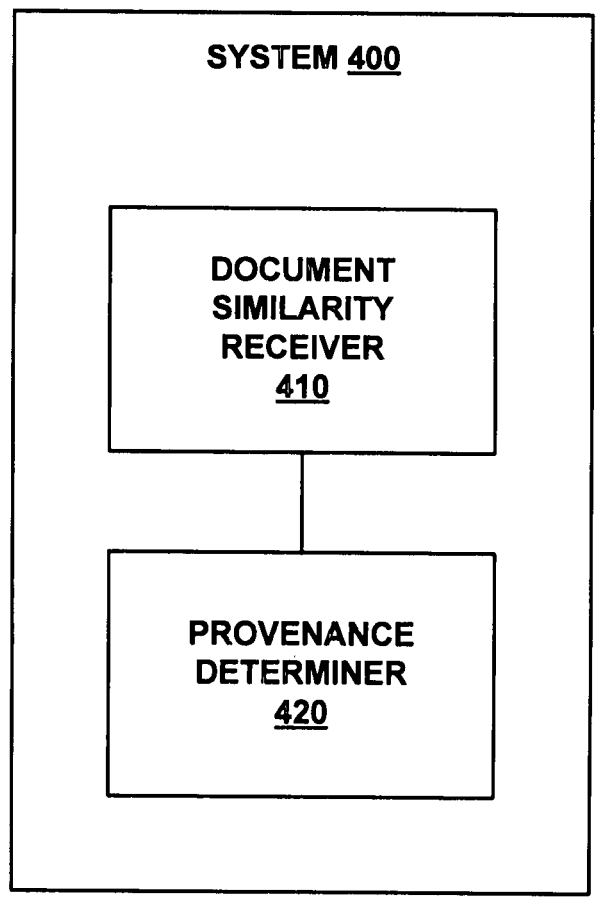
FIG. 4 depicts a block diagram of a system for determining a subset of documents from which a particular document was derived, according to one embodiment.

A System for Determining a Subset of Documents from which a Particular Document was Derived FIG. 4 depicts a block diagram of a system for determining a subset of documents from which a particular document was derived, according to one embodiment. The blocks depicted in FIG. 4 represent features of the system 400. The blocks that represent features in FIG. 4 can be arranged differently than as illustrated, and can implement additional or fewer features than what are described herein. Further, the features represented by the blocks in FIG. 4 can be combined in various ways. The system 400 can be implemented using software, hardware, firmware, or a combination thereof.

The system includes a document-similarity-receiver 410 and a provenance-based-on-document-content-determiner 420 (also referred to as a "provenance determiner"). The document similarity receiver 410 is coupled to the provenance determiner 420. The document-similarity-receiver 410 is configured for receiving similarity measurements indicating similarities between contents of documents. The provenance determiner 420 is configured for using dates the documents were created and the similarity measurements to determine a subset that a particular document was derived from. The subset is determined without requiring document tracking information to be associated with the documents.

Figure 5:
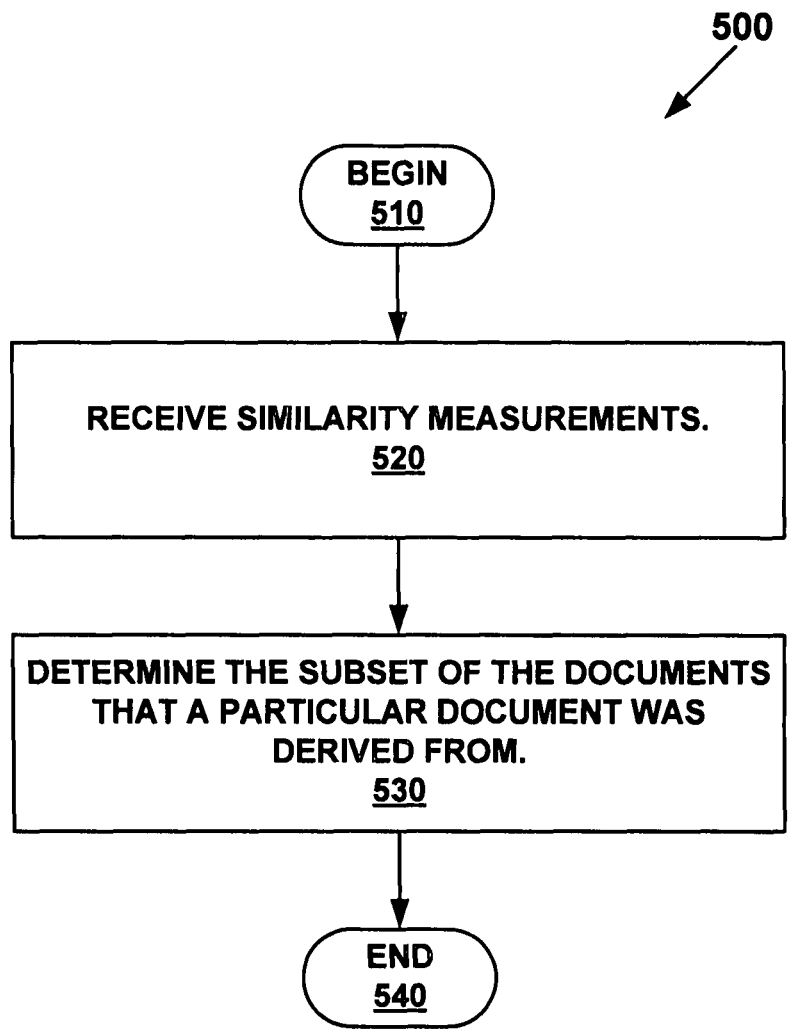
FIG. 5 depicts a flowchart describing a method of determining a subset of documents from which a particular document was derived, according to one embodiment.

A Method of Determining a Subset of Documents from which a Particular Document was Derived FIG. 5 depicts a flowchart describing a method of determining a subset of documents from which a particular document was derived, according to one embodiment. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed.

All of, or a portion of, the embodiments described by flowchart 500 can be implemented using computer-readable and computer-executable instructions which reside, for example, in computer-usable media of a computer system or like device. As described above, certain processes and steps of the present invention are realized, in an embodiment, as a series of instructions (e.g., software program) that reside within computer readable memory of a computer system and are executed by the computer system. When executed, the instructions cause the computer system to implement the functionality of the present invention as described below.

In step 510, the method begins.

In step 520, similarity measurements indicating similarities between contents of documents are received. Assume for the sake of illustration that a user is interested in analyzing the parents, grandparents, and great grandparents of document d2. Therefore, a maximum path length of 3 is used. Also, assume that a company has millions of documents. The millions of documents shall be referred to as a universe of documents. A similarity algorithm can compare each document to all of the other documents in the document universe and determine similarity measurements between all of the pairs of documents. A document-similarity-receiver 410 receives the similarity measurements for the pairs of documents. Assume that for the millions of documents in the document universe, the document-similarity-receiver 410 received the similarity measurements a-i for documents d1-d6. Since the values a-i are not zero, according to one embodiment, it is assumed that there are similarities between the documents d1-d6. Documents d1, d3-d6 are parents, grandparents, or great grandparents of document d2.

In step 530, the subset of the documents that the particular document was derived is determined. A provenance determiner 420 determines the subset. For example, the subset is determined based on dates the documents were created and the similarity measurements. The dates that the documents d1-d6 were created can be used to determine the direction that arrows associated with the forward-in-time graph 100 (FIG. 1) point. The similarity measurements a-i are associated with the lines between the pairs of documents associated with the forward-in-time graph 100.

A reversed in time graph 200 (FIG. 2) is created based on the forward-in-time graph 100 where the arrows between the pairs of documents are reversed and the similarity values are used to determine probabilities $p_1$-$p_9$ that one document was derived from another document, as described herein. A Markov chain is determined based on the reversed in time graph 200. A matrix of probabilities 320 (FIG. 3) between the documents is determined based on the Markov chain. The matrix of probabilities 320 is multiplied by itself until it reaches a state of stability or relative stability. The probabilities associated with the stable or relatively stable matrix are used to determine the subset of documents that document d2 was derived from. Dl, d3, d4, d5 and d6 is a subset of the millions of documents associated with the universe of documents. The subset d3, d1, d4, d5 and d6 was determined without requiring document tracking information to be associated with documents.

In step 540, the method ends.

Various embodiments have been described in various combinations. However, any two or more embodiments may be combined. Further, any embodiment may be used separately from other embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of determining a subset of documents from which a particular document was derived, the method comprising:
    receiving similarity measurements indicating similarities between contents of documents; and
    determining the subset of the documents that the particular document was derived from based on dates the documents were created and the similarity measurements without requiring document tracking information to be associated with the documents to determine the subset.

2. The method as recited by claim 1, further comprising:
    ranking documents associated with the subset based on how similar each document in the subset is to the particular document.

3. The method as recited by claim 1, wherein the determining of the subset of the documents further comprises:
    creating a forward-in-time graph based on the similarity measurements and the dates the documents were created.

4. The method as recited by claim 3, wherein the creating of the forward-in-time graph further comprises:
    associating arrows that point from older documents to newer documents for each document pair associated with the forward-in-time graph.

5. The method as recited by claim 3, wherein the creating of the forward-in-time graph further comprises:
    creating the forward-in-time graph that has path lengths from the particular document to other documents that are less than or equal to a user specified maximum path length value.

6. The method as recited by claim 3, wherein the determining of the subsets of the documents further comprises:
    creating a reverse-in-time graph based on the forward-in-time graph.

7. The method as recited by claim 6, wherein the determining of the subsets of the documents further comprises:
    creating an initial matrix of probabilities based on the reverse-in-time graph;
    multiplying the initial matrix of probabilities by itself, to create a plurality of matrixes wherein each matrix is considered a generation, until a matrix of probabilities is achieved, wherein the values from the matrix of probabilities is similar to the values from the previous generation matrix; and
    determining the subset from the matrix of probabilities.

8. A computer system for determining a subset of documents from which a particular document was derived, the system comprising:
    document-similarity-receiver configured for receiving similarity measurements indicating similarities between contents of documents; and
    provenance-based-on-document-content-determiner configured for using dates the documents were created and the similarity measurements to determine a subset of the documents that a particular document was derived from, wherein the subset of documents is determined without requiring document tracking information to be associated with the documents.

9. The computer system of claim 8, wherein the provenance-based-on-document-content-determiner is configured for creating a forward-in-time graph based on the similarity measurements and the dates the documents were created, wherein the forward-in-time graph has path lengths from the particular document to other documents that are less than or equal to a user specified maximum path length value.

10. The computer system of claim 9, wherein the provenance-based-on-document-content-determiner is configured for creating a reversed-in-time graph based on the forward-in-time graph, wherein one or more similarity values are normalized to determine a probability that one document associated with the reversed-in-time graph resulted in another document associated with the reversed-in-time graph.

11. The computer system of claim 10, wherein the provenance-based-on-document-content-determiner is configured for determining a Markov chain based on the reversed-in-time graph wherein documents associated with the reversed-in-time graph represent nodes of the Markov chain and probabilities determined based on normalized similarity values are associated with transitions between the nodes.

12. The computer system of claim 11, wherein the provenance-based-on-document-content-determiner is configured for determining an initial matrix of probabilities based on the Markov chain and multiplying the initial matrix by itself, to create a plurality of matrixes wherein each matrix is considered a generation, until a matrix of probabilities is achieved, wherein the values from the matrix of probabilities is similar to the values from the previous generation matrix.

13. The computer system of claim 12, wherein documents are represented by the rows and columns of the initial matrix and each probability is associated with a particular row and column pair of the initial matrix.

14. The computer system of claim 12, wherein the subset of documents is determined based on the matrix of probabilities.

15. A computer-usable storage medium having instruction embodied therein that when executed cause a computer system to perform a method for determining a subset of documents from which a particular document was derived, the method comprising
    receiving similarity measurements indicating similarities between contents of documents, wherein the documents are unstructured documents that do have document tracking information; and
    using the similarity measurements to determine a subset of the documents that a particular document was derived from whereby analyzing the unstructured documents is enabled.

16. The computer-usable storage medium of claim 15, wherein the computer-readable program code embodied therein causes a computer system to perform the method, and wherein further comprising:
    ranking documents associated with the subset based on how similar each document in the subset is to the particular document.

17. The computer-usable storage medium of claim 15, wherein the computer-readable program code embodied therein causes a computer system to perform the method, and wherein the determining of the subset of the documents further comprises:

creating a forward-in-time graph based on the similarity measurements and the dates the documents were created.

18. The computer-usable storage medium of claim 17, wherein the computer-readable program code embodied therein causes a computer system to perform the method, and wherein the creating of the forward-in-time graph further comprises:

creating the forward-in-time graph that has path lengths from the particular document to other documents that are less than or equal to a user specified maximum path length value; and creating a reverse-in-time graph based on the forward-in-time graph.

19. The computer-usable storage medium of claim 18, wherein the computer-readable program code embodied therein causes a computer system to perform the method, and wherein the determining of the subsets of the documents further comprises:

creating an initial matrix of probabilities based on the reverse-in-time graph;

multiplying the initial matrix of probabilities by itself, to create a plurality of matrixes wherein each matrix is considered a generation, until a matrix of probabilities is achieved, wherein the values from the matrix of probabilities is similar to the values from the previous generation matrix; and determining the subset from the matrix of probabilities.

20. The computer-usable storage medium of claim 15, wherein the computer-readable program code embodied therein causes a computer system to perform the method, and wherein the method further comprises:

determining an order that documents associated with the subset were used to derive the particular document based on how similar each document in the subset is to the particular document.

* * * * *